United States Patent
Hu

(10) Patent No.: US 10,705,953 B2
(45) Date of Patent: Jul. 7, 2020

(54) APPLICATION DEFINED MULTI-TIERED WEAR-LEVELING FOR STORAGE CLASS MEMORY SYSTEMS

(71) Applicant: Futurewei Technologies, Inc., Plano, TX (US)

(72) Inventor: Chaohong Hu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 15 days.

(21) Appl. No.: 15/909,582

(22) Filed: Mar. 1, 2018

(65) Prior Publication Data
US 2019/0272115 A1 Sep. 5, 2019

(51) Int. Cl.
G06F 12/00 (2006.01)
G06F 12/02 (2006.01)
G06F 3/06 (2006.01)

(52) U.S. Cl.
CPC ........ *G06F 12/0246* (2013.01); *G06F 3/0616* (2013.01); *G06F 3/0649* (2013.01); *G06F 3/0683* (2013.01)

(58) Field of Classification Search
None
See application file for complete search history.

(56) References Cited

U.S. PATENT DOCUMENTS

| 9,135,160 | B1* | 9/2015 | Zheng | G06F 12/0246 |
| 9,141,298 | B2 | 9/2015 | Sankar et al. | |
| 2011/0035535 | A1* | 2/2011 | Locasio | G11C 16/349 |
| | | | | 711/103 |
| 2012/0242671 | A1* | 9/2012 | Wyatt | G09G 5/001 |
| | | | | 345/520 |

FOREIGN PATENT DOCUMENTS

| CN | 103425586 A | 12/2013 |
| CN | 104714894 A | 6/2015 |

OTHER PUBLICATIONS

Qureshi, et al., "Enhancing Lifetime and Security of PCM-Based Main Memory with Start-Gap Wear Leveling," MICRO'09, Dec. 12-16, 2009, 10 pages.
"Wear-Leveling Techniques in NAND Flash Devices," Technical Notice, Micron, TN-29-42: Wear-Leveling Techniques in NAND Flash Devices, PDF: 09005aef83608137/Source: 09005aef836082ea, tn2942_nand_wear_leveling.fm—Rev. A 10/08 EN, 8 pages.
Machine Translation and Abstract of Chinese Publication No. CN103425586, dated Dec. 4, 2013, 33 pages.
(Continued)

*Primary Examiner* — Daniel D Tsui
(74) *Attorney, Agent, or Firm* — Conley Rose, P.C.

(57) ABSTRACT

A method implemented by a memory device, comprising obtaining, by a processor coupled to a memory, a wear-leveling policy from an application executable at the memory device, wherein the wear-leveling policy indicates a memory size by which to perform wear-leveling within an instance, wherein the instance comprises an address range assigned to the application in the memory of the memory device, obtaining, by a processor, a request to access the instance, and performing, by the processor, wear-leveling on a plurality of memory cells within the instance according to the wear-leveling policy.

17 Claims, 11 Drawing Sheets

(56) References Cited

OTHER PUBLICATIONS

Machine Translation and Abstract of Chinese Publication No. CN104714894, dated Jun. 17, 2015, 16 pages.
Foreign Communication From a Counterpart Application, PCT Application No. PCT/CN2019/075737, English Translation of International Search Report dated May 20, 2019, 6 pages.
Foreign Communication From a Counterpart Application, PCT Application No. PCT/CN2019/075737, English Translation of Written Opinion dated May 20, 2019, 4 pages.

* cited by examiner

| 803 STORAGE STRUCTURES | 806 DATA STRUCTURE/ ACCESS PATTERN | 809 MEMORY SIZE | 811 PERSISTENCE REQUIREMENT | 812 WL POLICY - NIBBLE-LEVEL WL | 815 WL POLICY - CODEWORD-LEVEL WL | 818 WL POLICY - SECTOR-LEVEL WL | 821 WL POLICY - X-INSTANCE WL |
|---|---|---|---|---|---|---|---|
| 825 READ CACHE METADATA | PERSISTENT HASH TABLE/ RAND READ, RAND WRITE, BYTE-SIZE ACCESS | 3GB | MEDIUM | Y | Y | Y | Y |
| 828 READ CACHE DATA | RAND READ, RAND WRITE, BLOCK SIZE ACCESS | 100GB | MEDIUM | N | N | Y | Y |
| 831 WRITE JOURNALING | ARTree/ SEQUENCE READ, SEQUENCE WRITE, BYTE-SIZE ACCESS | 100GB | HIGH | Y | Y | Y | N |
| 834 WRITE CACHE DATA | SEQUENCE READ, SEQUENCE WRITE, BLOCK-SIZE ACCESS | 10GB | HIGH | N | N | Y | N |

FIG. 8

| 903 | 906 | 909 | 911 | 912 | 915 | 918 |
|---|---|---|---|---|---|---|
| MEMORY USAGE/ACCESS PATTERN | MEMORY SIZE | QoS REQUIREMENT | WL POLICY - NIBBLE-LEVEL WL | WL POLICY - CODEWORD-LEVEL WL | WL POLICY - SECTOR-LEVEL WL | WL POLICY - X-INSTANCE WL |
| 930 INSTRUCTIONS/ READ ONLY, EXECUTABLE, BYTE-SIZE ACCESS | 10GB | HIGH | N | N | N | N |
| 931 LITERALS/ READ ONLY, NON-EXECUTABLE, BYTE-SIZE ACCESS | 20GB | MEDIUM | N | N | N | Y |
| 932 STACK/ SEQUENCE READ, SEQUENCE WRITE, BYTE-SIZE ACCESS | 20GB | MEDIUM | Y | Y | Y | Y |
| 933 HEAP/RAND READ, RAND WRITE, BYTE-SIZE ACCESS | 40GB | MEDIUM | Y | Y | Y | Y |
| 934 STATIC DATA/RAND READ, RAND WRITE, BYTE-SIZE ACCESS | 50GB | MEDIUM | Y | Y | Y | Y |

FIG. 9

APPLICATION DEFINED MULTI-TIERED WEAR-LEVELING FOR STORAGE CLASS MEMORY SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The wear on memory cells, or physical locations, within a memory system varies depending upon how often each of the cells is programmed. If a memory cell is programmed once and then effectively never reprogrammed, the wear associated with that cell will generally be relatively low. However, if a cell is repetitively written to and erased, the wear associated with that cell will generally be relatively high. As physical addresses are used by hosts, the same physical locations or cells within the memory system are repeatedly written to and erased if a host repeatedly uses the same addresses to write and overwrite data.

SUMMARY

According to one aspect of the present disclosure, there is provided a method implemented by a memory device, comprising obtaining, by a processor coupled to a memory, a wear-leveling policy from an application executable at the memory device, wherein the wear-leveling policy indicates a memory size by which to perform wear-leveling within an instance, wherein the instance comprises an address range assigned to the application in the memory of the memory device, obtaining, by a processor, a request to access the instance, and performing, by the processor, wear-leveling on a plurality of memory cells within the instance according to the wear-leveling policy.

Optionally, in any of the preceding aspects, another implementation of the aspect provides that the memory size is at least one of a bit, a nibble, a codeword, or a sector.

Optionally, in any of the preceding aspects, another implementation of the aspect provides that performing wear-leveling on the plurality of memory cells according to the wear-leveling policy comprises moving data of the memory size stored in the plurality of memory cells to different ones of the plurality of memory cells.

Optionally, in any of the preceding aspects, another implementation of the aspect provides that the method further comprises determining, by the processor, whether a write count for the address range associated with the memory size is greater than or equal to a wear-leveling threshold, wherein wear-leveling is performed when the write count is greater than or equal to the wear-leveling threshold.

Optionally, in any of the preceding aspects, another implementation of the aspect provides that the request to access the instance is a write request comprising an address of a nibble, the wear-leveling policy indicates that the memory size by which to perform wear-leveling is the nibble, the nibble comprises four bits of data, and the method further comprises obtaining, by the processor, a write count of the nibble associated with the address in the write request, and incrementing, by the processor, a write count of a codeword associated with the address when the write count of the nibble is greater than or equal to a write count threshold.

Optionally, in any of the preceding aspects, another implementation of the aspect provides that the request to access the instance is a write request comprising an address of a codeword, the wear-leveling policy indicates that the memory size by which to perform wear-leveling is the codeword, and the method further comprises obtaining, by the processor, a write count of the codeword associated with the address in the write request, and incrementing, by the processor, a write count of a sector associated with the address when the write count of the codeword is greater than or equal to a write count threshold.

Optionally, in any of the preceding aspects, another implementation of the aspect provides that the request to access the instance is a write request comprising an address of a sector, the wear-leveling policy indicates that the memory size by which to perform wear-leveling is the sector, and the method further comprises obtaining, by the processor, a write count of the sector associated with the address in the write request, and incrementing, by the processor, a write count of the instance when the write count of the sector is greater than or equal to a write count threshold.

Optionally, in any of the preceding aspects, another implementation of the aspect provides that the method further comprises obtaining, by a processor, a cross-instance wear-leveling policy from a second application executable at the memory device, wherein the cross-instance wear-leveling policy indicates whether wear-leveling between instances assigned to different applications is permitted, and performing, by the processor, cross-instance wear-leveling between the instance of the application and a second instance assigned to the second application when the cross-instance wear-leveling policies of the application and the second application indicate that wear-leveling between memory cells assigned to different applications is permitted.

Optionally, in any of the preceding aspects, another implementation of the aspect provides that the cross-instance wear-leveling is performed in response to a write count of the address range being greater than or equal to a cross-instance wear-leveling threshold.

According to one aspect of the present disclosure, there is provided a memory device, comprising a memory and a processor coupled to the memory and configured to obtain a wear-leveling policy from an application executable at the memory device, wherein the wear-leveling policy indicates a memory size by which to perform wear-leveling within an instance, wherein the instance comprises an address range assigned to the application in the memory of the memory device, obtain a request to access the instance, and perform wear-leveling on a plurality of memory cells within the instance according to the wear-leveling policy.

Optionally, in any of the preceding aspects, another implementation of the aspect provides that the wear-leveling policy indicates that wear-leveling may be performed on a sector level or instance level.

Optionally, in any of the preceding aspects, another implementation of the aspect provides that the memory size is at least one of a bit, a nibble, a codeword, or a sector.

Optionally, in any of the preceding aspects, another implementation of the aspect provides that the processor is further configured to move data of the memory size stored in the plurality of memory cells to different ones of the plurality of memory cells.

Optionally, in any of the preceding aspects, another implementation of the aspect provides that the processor is further configured to determine whether a write count for the address range associated with the memory size is greater than or equal to a wear-leveling threshold, wherein the wear-leveling is performed when the write count is greater than or equal to the wear-leveling threshold.

Optionally, in any of the preceding aspects, another implementation of the aspect provides that the request to access the instance is a write request comprising an address of a nibble, the wear-leveling policy indicates that the memory size by which to perform wear-leveling is the nibble, and the processor is further configured to obtain a write count of the nibble associated with the address in the write request, and increment a write count of the nibble associated with the address in the write request.

According to one aspect of the present disclosure, there is provided a memory device, comprising a storage class memory (SCM), a memory coupled to the SCM and comprising instructions, and a processor coupled to the SCM and the memory, wherein the processor executes the instructions to obtain a wear-leveling policy from an application executable at the memory device, wherein the wear-leveling policy indicates a memory size by which to perform wear-leveling within an instance, wherein the instance comprises an address range assigned to the application in the memory of the memory device, obtain a request to access the instance, and perform wear-leveling on a plurality of memory cells within the instance according to the wear-leveling policy.

Optionally, in any of the preceding aspects, another implementation of the aspect provides that the request to access the instance is a write request comprising an address of a codeword, the wear-leveling policy indicates that the memory size by which to perform wear-leveling is the codeword, and the processor further executes the instructions to obtain a write count of the codeword associated with the address in the write request, and increment a write count of a sector associated with the address when the write count of the codeword is greater than or equal to a write count threshold after the wear-leveling is performed.

Optionally, in any of the preceding aspects, another implementation of the aspect provides that the request to access the instance is a write request comprising an address of a sector, the wear-leveling policy indicates that the memory size by which to perform wear-leveling is the sector, and the processor further executes the instructions to obtain a write count of the sector associated with the address in the write request; and increment a write count of the instance when the write count of the sector is greater than or equal to a write count threshold.

Optionally, in any of the preceding aspects, another implementation of the aspect provides that the processor further executes the instructions to obtain a cross-instance wear-leveling policy from a second application executable at the memory device, wherein the cross-instance wear-leveling policy indicates whether wear-leveling between instances assigned to different applications is permitted, and perform cross-instance wear-leveling between the instance to the application and a second instance assigned to the second application when the cross-instance wear-leveling policy of the application and the second application indicates that wear-leveling between memory cells assigned to different applications is permitted.

Optionally, in any of the preceding aspects, another implementation of the aspect provides that the cross-instance wear-leveling is performed in response to a write count of the address range being greater than or equal to a cross-instance wear-leveling threshold.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 shows a table illustrating how different examples of storage structures, data structures, and access patterns may use the wear-leveling policies disclosed herein.

FIG. 9 shows a table further illustrating how different examples of storage structures having different memory usage, access patterns, memory sizes, and Quality of Service (QoS) requirements may use the wear-leveling policies 130 disclosed herein.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Wear-leveling is the process of moving around data such that the data is stored at different physical addresses in the memory at different times to prevent some memory cells from being worn out before others. Typical methods of wear-leveling are performed on a memory in a course grained manner in which thousands of bits change locations during one iteration of wear-leveling. Typical methods of wear-leveling also do not take into account the application that is associated with the data stored at the memory cells or accessing the memory cells.

Embodiments of the present disclosure are directed to enabling applications to define wear-leveling policies based on application requirements or preferences. For example, an application is assigned an instance within a memory, where an instance is a memory address range. In an embodiment, an application may define a wear-leveling policy including a memory size by which wear-leveling should be performed within the instance. In this way, wear-leveling may be performed in an application specific manner while enabling a more fine-grained method of wear-leveling, thereby extending the lifecycle of the memory system.

Figure 1:
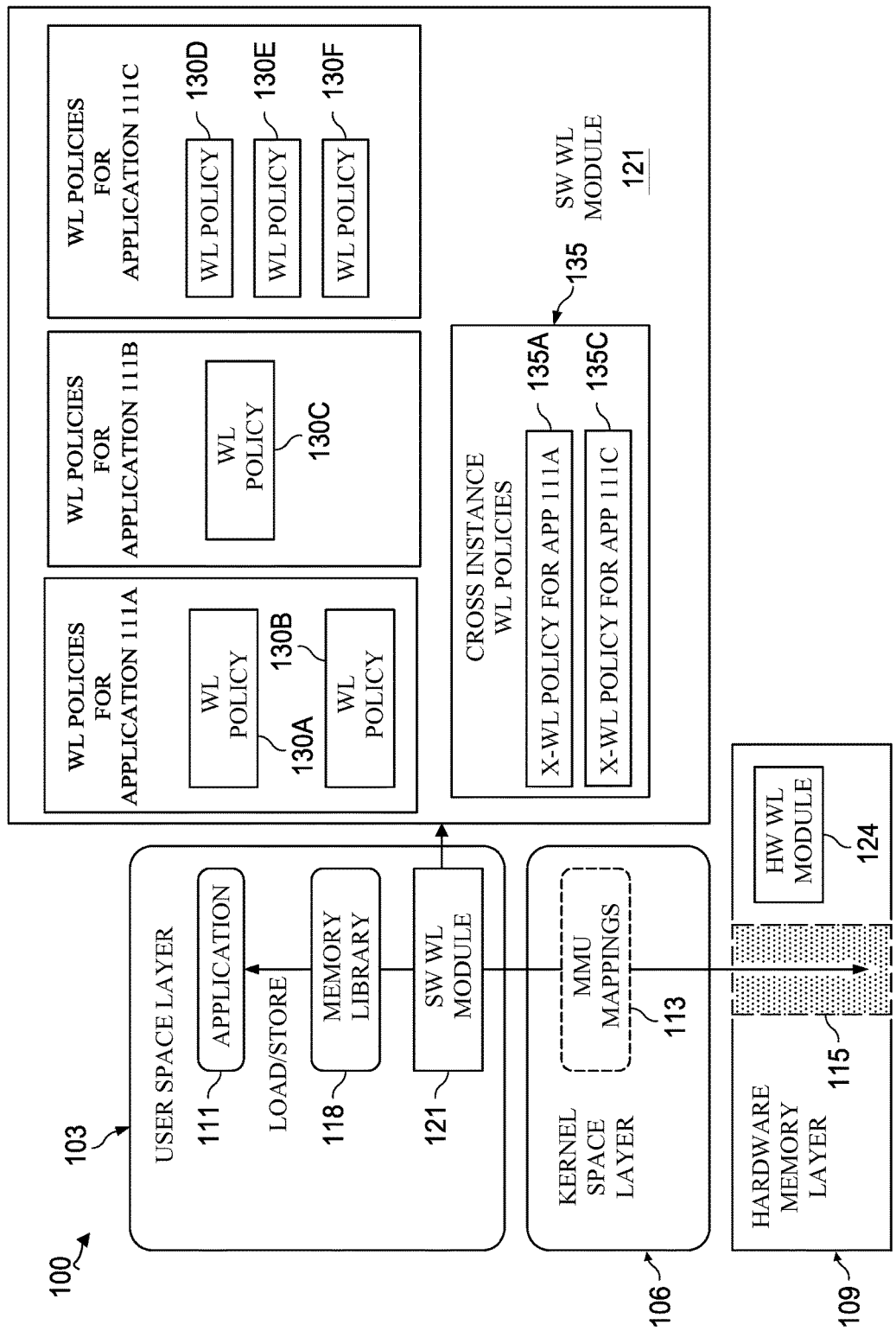
FIG. 1 is a schematic diagram illustrating a memory system of a device, or host, according to an embodiment of the disclosure.

FIG. 1 is a schematic diagram illustrating a memory system 100 of a device, or host, according to an embodiment of the disclosure. The memory system 100 may be included as part of a individual computing device, such as a user equipment (UE), or a server located in a central office (CO) of a network service provider. The memory system 100 of the device may include a user space layer 103, a kernel space layer 106, and a hardware memory layer 109. The user space layer 103 may include applications 111, which may be low level applications executed by users operating the device. For example, the applications 111 may be streaming media applications, social media applications, electronic communications applications, messaging applications, or any other type of application executed by the device. The kernel space layer 106 may be, for example, the operating system of the device that interfaces with both the user space layer 103 and the hardware memory layer 109 to provide services to the user of the device. The kernel space layer 106 may include a memory mapping unit (MMU) module 113 that is configured to map virtual memory addresses to physical memory addresses. For example, a mapping table may be used by the kernel space layer 106 to translate virtual addresses into corresponding physical addresses when requested by an application 111. For example, a virtual address may be an address generated by a Central Processing Unit (CPU) of the device during execution. A virtual address is the address than an application 111 uses to access the hardware memory layer 109. A physical address of the hardware memory layer 109 refers to a hardware address of the physical memory cell in the hardware memory layer 109. The virtual address may be the same or different from the corresponding physical address.

The hardware memory layer 109 may include a memory of the device that is accessible by the various applications 111 executable at the device. For example, the hardware memory layer 109 may be storage class memory (SCM), such as a 3-Dimensional (3D) CrossPoint (XPoint) memory, a phase-change Random Access Memory (RAM), or any Resistive RAM. The hardware memory layer 109 may include multiple memory cells, where each memory cell is configured to store one bit of data. In some embodiments, the hardware memory layer 109 may be divided into sections according to various memory sizes, as will be further described with reference to FIG. 3. Typically, an application 111 is assigned to or requests an instance 115, or a virtual address range of memory locations in the hardware memory layer 109. The virtual address range may correspond to a physical address range within the hardware memory layer 109, wherein the physical address range includes one or more memory cells within the hardware memory layer 109. When an application 111 accesses the instance 115 using, for example, a read or write function, the application 111 may use a memory library 118, such as PMemLib, to interface with the MMU module 113. The MMU module 113 may provide access to the physical address of the hardware memory layer 109 within the instance 115 in response to the read or write function requested by the application 111.

In an embodiment in which the hardware memory layer 109 is an SCM, the SCM also includes multiple cells, where each cell may be a minimum physical unit configured to store data. A SCM is a nonvolatile storage technology using low cost materials such as chalcogenides, perovskites, phase change materials, magnetic bubble technologies, carbon nanotubes, and etc. SCMs exhibit Dynamic Random Access Memory (DRAM)-like performance at a lower cost than DRAM. The extrapolated cost over time can be equivalent to or less than that of enterprise class disk drives. The cost performance of the SCMs provides a level in the storage hierarchy between the DRAM main system memory and disk storage. This level of storage may be viewed as a very large disk cache in which data can be stored permanently due to the nonvolatile characteristics of storage class memories.

A SCM is typically bit-alterable, similar to a DRAM, which allows the user or administrator to change the data on a per-bit basis. Hence, SCM is suitable as a replacement/extension of either disk storage or system memory. However, unlike DRAM and disk drives, SCM technologies provide a finite number of write cycles. Flash memories also exhibit this characteristic. While flash memories provide $10^3$ to $10^6$ write cycles, SCM technologies support $10^6$ to $10^{12}$ write cycles.

When some cells are effectively worn out while other cells are relatively unworn, the existence of the worn out cells generally compromises the overall performance of the memory system 100. In addition to degradation of performance associated with worn out cells themselves, the overall performance of the memory system 100 may be adversely affected when an insufficient number of cells which are not worn out are available to store desired data. Often, a memory system 100 may be deemed unusable when a critical number of worn out cells are present in the memory system 100, even when many other cells are relatively unworn.

To increase the likelihood that cells within a memory system are worn fairly evenly, wear-leveling operations are often performed. Wear-leveling operations are generally arranged to allow the data that is stored at certain cells, which are associated with particular addresses, to be changed such that the same data is not always stored at the same cells. By changing the data stored at each of cells, it is less likely that a particular cell may wear out well before other cells wear out.

Typical memory systems maintain an address mapping table that stores a mapping between a physical address of data and a virtual address (or logical address) of data. Wear-leveling is typically performed by changing the physical address of the data periodically without changing the logical address of the data. However, typical methods of wear-leveling are performed on a memory in a course grained manner in which thousands of bits change locations during one iteration of wear-leveling. For example, one iteration of wear-leveling involves changing locations of thousands of bits, such as 4,000 (4K) bytes or 16,000 (16K)

bytes, to prevent the cells from wearing unevenly. Typical methods of wear-leveling also do not take into account the application 111 that is associated with the data stored at the memory cells or accessing the memory cells.

According to various embodiments, the memory system 100 is configured to perform wear-leveling based on policies specified by different applications 111 and according to different tiers of memory storage within the hardware memory layer 109. To this end, the memory system 100 further comprises a software wear-leveling module 121 and a hardware wear-leveling module 124. In an embodiment, the software wear-leveling module 121 interfaces with the memory library 118 to enable the application 111 to specify one or more wear-leveling policies 130. In an embodiment, a wear-leveling policy 130 defines the manner in which wear-leveling is to be performed within an instance 115 assigned to an application 111 in the hardware memory layer 109. As will be further described below, a wear-leveling policy 130 may indicate that wear-leveling be performed within the instance 115 according to a memory size, such as based on a nibble or bit level, a codeword level, and/or a sector level. In this way, a wear-leveling policy 130 may be a set of software and/or hardware executable instructions that are defined by an application 111, where the instructions are executed by the hardware wear-leveling module 124 to perform wear-leveling for the application 111. In an embodiment, hardware wear-leveling module 124 may be executed in the hardware memory layer 109 to perform wear-leveling within the instance 115 according to the wear-leveling policy 130. For example, the wear-leveling policy 130 may be a set of instructions stored at the memory system 100 such that a processor of the memory system is configured to receive the stored instructions and execute the stored instructions according to methods 400, 500, 600, and 700 described below.

In some embodiments, the software wear-leveling module 121 receives wear-leveling policies 130 from different applications 111A-C. As shown in FIG. 1, application 111A may configure two wear-leveling policies 130A and 130B for the instance 115 corresponding to application 111A. The different wear-leveling policies 130A and 130B indicate different levels by which wear-leveling should be performed on instance 115 corresponding to application 111A. For example, application 111A may set wear-leveling policy 130A to instruct the memory system 100 to perform wear-leveling on the instance 115 corresponding to application 111A on a nibble level. Similarly, application 111A may set wear-leveling policy 130A to instruct the memory system 100 to perform wear-leveling on the instance 115 corresponding to application 111A on a sector level. Application 111B may similarly configure a wear-leveling policy 130C for the instance 115 corresponding to application 111B, and application 111C may similarly configure wear-leveling policies 130D-F for the instance 115 corresponding to application 111C. As should be appreciated, the instance 115 corresponding to each of applications 111A-C may be different virtual address ranges in the hardware memory layer 109.

In some embodiments, the software wear-leveling module 121 receives one or more cross-instance wear-leveling policies 135 from various applications 111. A cross-instance wear-leveling policy 135 may be a policy indicating whether an application 111 permits wear-leveling to be performed with the instance 115 and other instances 115 assigned to other applications 111, as will be further described below. As shown in FIG. 1, the cross-instance wear-leveling policy 135A (shown as X-WL policy in FIG. 1) indicates that application 111A have set policies that permit cross-instance wear-leveling, and the cross-instance wear-leveling policy 135C indicates that application 111C have set policies that permit cross-instance wear-leveling. In an embodiment, cross-instance wear-leveling is performed by swapping, switching, or changing memory locations of the instance 115 assigned to application 111A with the instance 115 assigned to application 111C. Cross-instance wear-leveling may be performed between multiple instances 115 for different applications 111 based on whether the application has set a cross-instance wear-leveling policy that permits cross-instance wear-leveling. According to some embodiments, applications 111 may customize how the memory cells within a corresponding instance 115 and across other instances 115 are wear-leveled.

The use of application defined wear-leveling policies 130 as disclosed herein are advantageous over previous methods of wear-leveling. This is because the use of application defined wear-leveling policies 130 enable applications 111 to customize how wear-leveling is to be performed on the memory segments that are allocated to that application. Such customization on an application basis is beneficial because each application may have access to different types of data that should be wear-leveled differently. For example, suppose a single device executes multiple applications, where a first application stores, updates, and accesses user data frequently, and a second application has a high persistence requirement in which the data stored in association with the second application should not be corrupted. Previous of methods of wear-leveling did not take the application characteristics or requirements into account when performing wear-leveling on the memory of the device. Embodiments of the present disclosure enable the application to customize how the data associated with the different applications should be wear-leveled. For example, the first application may implement multiple levels of wear-leveling policies using the embodiments disclosed herein to enable the memory cells associated with the application to wear out evenly. The second application may not permit wear-leveling on the data associated with the second application or may not permit cross-instance wear-leveling to prevent from corrupting the data. In addition, embodiments of the present disclosure enable wear-leveling to be performed on a memory in a more fine-grained manner in which smaller memory segments are wear-leveled with one another based on the wear-leveling policies 130. Therefore, the embodiments of the present disclosure enable memory systems such as memory system 100 to live longer than memory systems that use traditional methods of wear-leveling.

Figure 2:
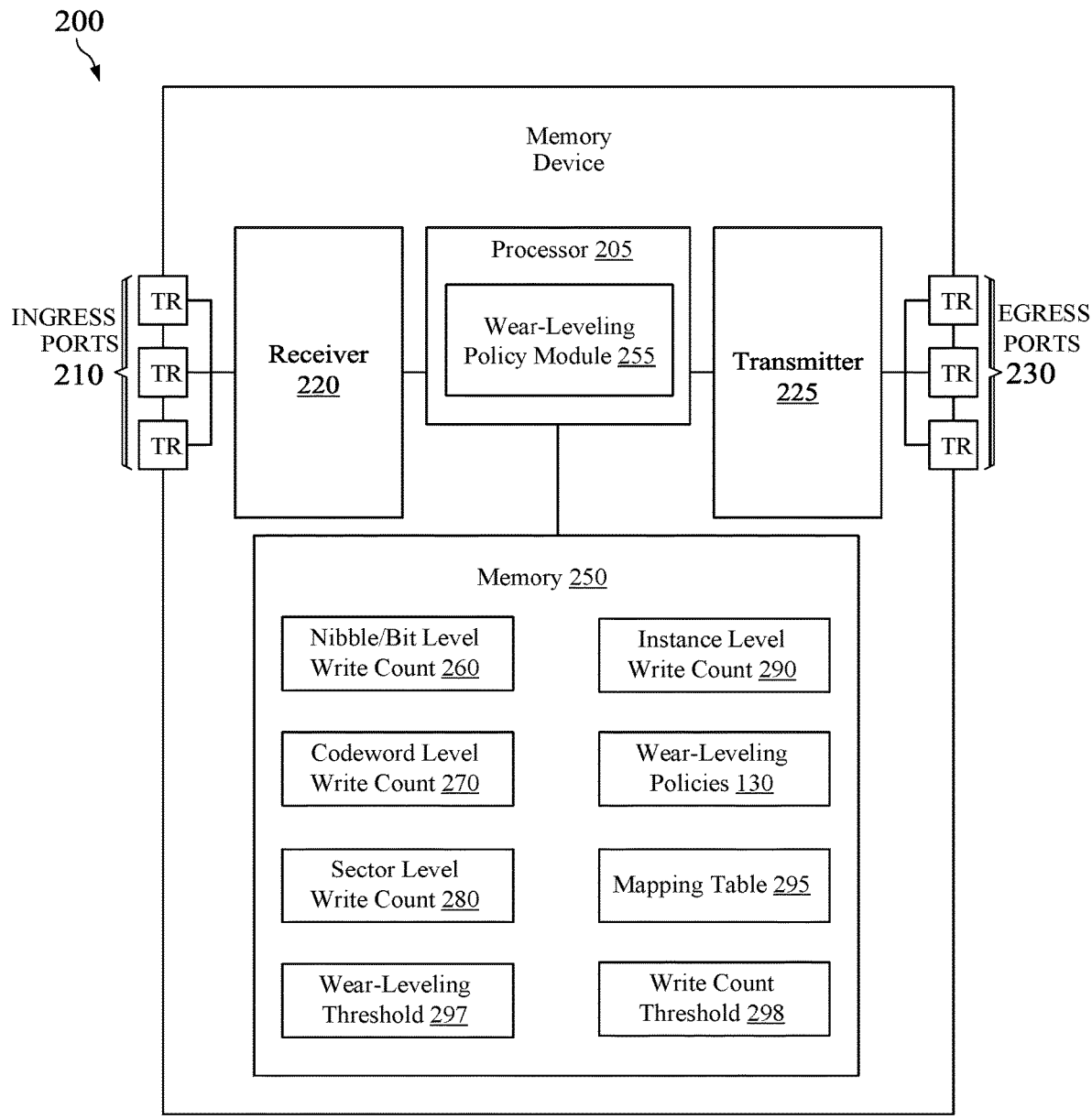
FIG. 2 is a diagram of an embodiment of a memory device, such as the device including the memory system 100.

FIG. 2 is a diagram of an embodiment of a memory device 200, such as the device including the memory system 100. The memory device may be included as part of an individual computing device, such as a UE, or a server located in a CO of a network service provider. In this way, the embodiments of application defined wear-leveling disclosed herein is applicable to small scale computing devices operated by end users or large scale cloud computing devices operated by service providers. The memory device 200 may be configured to implement and/or support the application defined wear-leveling mechanisms described herein. The memory device 200 may be implemented in a single node or the functionality of memory device 200 may be implemented in a plurality of nodes. One skilled in the art will recognize that the term memory device encompasses a broad range of devices of which memory device 200 is merely an example. The memory device 200 is included for purposes of clarity of discussion, but is in no way meant to limit the application of the present disclosure to a particular memory device embodiment or class of memory device embodiments. At least some of the features and/or methods described in the disclosure may be implemented in a network apparatus or module such as a memory device 200. For instance, the features and/or methods in the disclosure may be implemented using hardware, firmware, and/or software installed to run on hardware. As shown in FIG. 2, the memory device 200 comprises one or more ingress ports 210 and a receiver unit (Rx) 220 for receiving data, at least one processor, logic unit, or central processing unit (CPU) 205 to process the data, a transmitter unit (Tx) 225 and one or more egress ports 230 for transmitting the data, and a memory 250 for storing the data.

The processor 205 may comprise one or more multi-core processors and be coupled to a memory 250, which may function as data stores, buffers, etc. The processor 205 may be implemented as a general processor or may be part of one or more application specific integrated circuits (ASICs) and/or digital signal processors (DSPs). The processor 205 may comprise a wear-leveling policy module 255, which may perform processing functions of the software wear-leveling module 121, and implement methods 400, 500, 600, and 700, as discussed more fully below, and/or any other method discussed herein. As such, the inclusion of the wear-leveling policy module 255 and associated methods and systems provide improvements to the functionality of the memory device 200. Further, the wear-leveling policy module 255 effects a transformation of a particular article (e.g., the network) to a different state. In an alternative embodiment, wear-leveling policy module 255 may be implemented as instructions stored in the memory 250, which may be executed by the processor 205. In some embodiments, processor 205 executes the wear-leveling policy module 255 to implement methods 400, 500, 600, and 700 such that when a wear-leveling policy 130 is to be implemented on an instance 115, the processor 205 receives the set of instructions that corresponds to the wear-leveling policy 130 from the memory 250 and executes the set of instructions that corresponds to the wear-leveling policy 130. In this way, implementing a wear-leveling policy 130 refers to receiving and executing the set of instructions that corresponds to the wear-leveling policy 130.

The memory 250 may be similar to the hardware memory layer 109, implemented as an SCM, as described above. The memory 250 may comprise additional memories that, for example, comprise a cache for temporarily storing content, e.g., a random-access memory (RAM). Additionally, the memory 250 or the additional memories may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. In an embodiment, the memory 250 may comprise a nibble/bit level write count 260, a codeword level write count 270, a sector level write count 280, an instance level write count 290, wear-leveling policies 130, a mapping table 295, a wear-leveling threshold 297, and a write count threshold 298.

A write count, or word count, refers to the number of times that one or more memory cells have been accessed (e.g., written to, read, etc). As described below with reference to FIG. 3, the hardware memory layer 109 may be divided into various memory sizes, such as a bit, nibble, codeword, sector, and/or instance 115. In this way, the nibble/bit level write count 260 may be a write count for a particular bit or nibble within an instance 115. The codeword level write count 270 may be a write count for a codeword within an instance 115. The sector level write count 280 may be a write count for a sector within an instance 115. The instance level write count 290 may be a write count for the entire instance 115. The wear-leveling threshold 297 is a minimum value that a write count should be before performing wear-leveling.

A write count threshold 298 is a minimum value that a write count should be before performing carry-in on a higher level write count. In an embodiment, there may be a write count for each memory size within an instance 115, and each memory size may be associated with a different write count threshold 298. For example, each bit may have one write count, each nibble may have another write count, each codeword may have another write count, and each sector may have another write count. The bit may be the lowest level of the memory size, and thus has the lowest level write count and write count threshold 298. The nibble may be the next level of the memory size, and thus has a higher level write count and write count threshold 298 relative to the bit level. The codeword may be the next level of the memory size, and has a higher level write count and write count threshold 298 relative to the nibble level. The sector may be the next level of the memory size, and has a higher level write count and write count threshold 298 relative to the codeword level.

In some embodiments, the write count for each level and write count threshold for each level are related to each other. For example, a write count for a higher level memory size is incremented when a write count for a lower level memory size meets the write count threshold 298 for that memory size. As an illustrative example, suppose the write count threshold 298 for the nibble level write count is 100. When a write count of the nibble level reaches 100, then the write count for the higher level memory size, which is the write count for the codeword level, is incremented by 1. A carry in on a higher level write count occurs when a write count for a higher level memory size is incremented based on the write count for the lower level memory size reaching the write count threshold 298.

The wear-leveling policies 130 include the policies specified by each of applications 111 regarding a memory size by which to perform wear-leveling within the instance 115 corresponding to the application 111. In some embodiments, the wear-leveling policies 130 may include a library of executable code or instructions that corresponds to one or more wear-leveling policies 130 set by different applications 111. When a wear-leveling policy 130 is implemented, the processor 205 may obtain (or fetch) the executable code or instructions that corresponds to the wear-leveling policy 130 from the memory 250 and then execute the code or instructions. The mapping table 295 includes mappings of virtual addresses (or logical addresses) of data to the corresponding physical address within the memory 250.

It is understood that by programming and/or loading executable instructions onto the memory device 200, at least one of the processor 205 and/or memory 250 are changed, transforming the memory device 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus.

Figure 3:
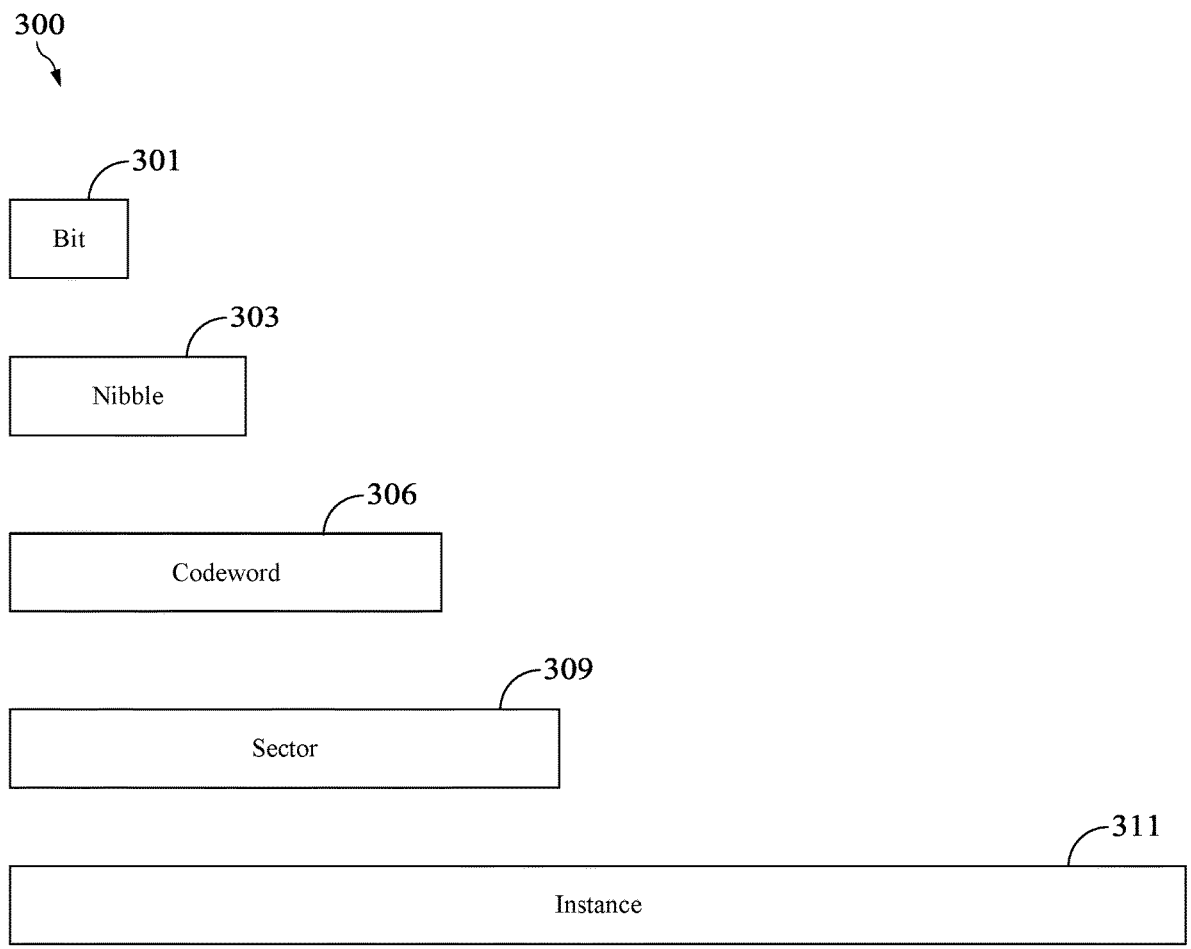
FIG. 3 is a schematic diagram illustrating different memory sizes by which wear-leveling may be performed according to various embodiments of the disclosure.

FIG. 3 is a schematic diagram illustrating different memory sizes 300 by which wear-leveling may be performed according to various embodiments of the disclosure. As discussed above, wear-leveling is the process of moving around data such that the data is stored at different physical addresses in the memory at different times to prevent some memory cells from being worn out before others. The mapping table 295 keeps track of the data as the data is moved around to different locations during each iteration of wear-leveling. For example, data may typically have the same virtual address, which is the address used by application 111 to access the data, even though the actual physical address of the data may change after wear-leveling is performed.

The hardware memory layer 109, which may be a SCM, may be divided into different sizes of memory, such as the memory sizes shown in FIG. 3. The first memory size shown in FIG. 3 is the bit level 301, which includes one bit of data that may be stored in one memory cell in the hardware memory layer 109. When a wear-leveling policy 130 instructs the memory system 100 to perform wear-leveling on the bit level 301, then the physical address (i.e., location) of one or more bits of data are changed within the instance 115. The virtual address of the bits of data that are relocated may remain the same while the physical address changes. The mapping table 295 may be updated to reflect the changed physical address of these bits of data.

The second memory size shown in FIG. 3 is the nibble level 303, including a nibble. A nibble may be an aggregation of four bits of data which can be stored in four cells configured to store a single-bit per cell, two cells configured to store two bits per cell, or one cell configured to store 4 bits per cell. When a wear-leveling policy 130 instructs the memory system 100 to perform wear-leveling on the nibble level 303, then the physical address (i.e., location) of one or more nibbles of data are changed within the instance 115. The virtual address of the nibbles of data that are relocated may remain the same while the physical address changes. The mapping table 295 may be updated to reflect the changed physical address of these nibbles of data.

The third memory size shown in FIG. 3 is the codeword level 306 including a codeword. A codeword may be any number of bits, so long as it includes user bits and a single independent Error-Correcting Code (ECC) bit set. A codeword may be about 32 Bytes (B) to 256B. The user bits are data bits and the ECC bits are bits used for performing error detection and correction on the user bits. A codeword may be represented by a single virtual address and/or physical address, each bit within the codeword may be represented by a virtual address, and each memory cell storing the bits of the codeword may be represented by a physical address. When a wear-leveling policy 130 instructs the memory system 100 to perform wear-leveling on the codword level 306, then the physical address (i.e., location) of one or more codewords of user bits and ECC bits are changed within the instance 115. The virtual address of the codewords of data that are relocated may remain the same while the physical address changes. The mapping table 295 may be updated to reflect the changed physical address of these codewords of data.

The fourth memory size shown in FIG. 3 is the sector level 309 including a sector. A sector may be any number of bits, which may be preset by an administrator of the memory system 100. The sector may be managed by the memory system 100 using a translation table, such as a flash translation table or a page mapping table. A sector may include kilobytes (KB) to megabytes (MB) of data. A sector may be represented by a single virtual address and/or physical address, each bit within the sector may be represented by a virtual address, and each memory cell storing the bits of the sector may be represented by a physical address. When a wear-leveling policy 130 instructs the memory system 100 to perform wear-leveling on the sector level 309, then the physical address (i.e., location) of one or more sectors are changed within the instance 115. The virtual address of the sectors of data that are relocated may remain the same while the physical address changes. The mapping table 295 may be updated to reflect the changed physical address of these sectors of data.

The fifth memory size shown in FIG. 3 is the instance level 311, which corresponds to instance 115. As discussed above, instance 115 is a number of bits corresponding to a virtual address range and a physical address range that is assigned to a certain application 111. The application 111 corresponding to the instance 115 typically accesses the memory cells within the instance 115 as needed. When a cross-instance wear-leveling policy 135 indicates that an application 111 permits cross-instance wear-leveling, the entire instance 115 changes locations, or swaps locations, with another instance 115 corresponding to another application 111. In effect, the data corresponding to a first application 111 swaps locations with data corresponding to a second application 111.

The memory sizes 300 shown in FIG. 3, including the bit level 301, nibble level 303, codeword level 306, sector level 309, and instance level 311, are examples of memory sizes by which an instance 115 may be divided. As should be appreciated, an instance 115 may be divided into any other memory size as designated by an administrator of the memory system 100.

Figure 4:
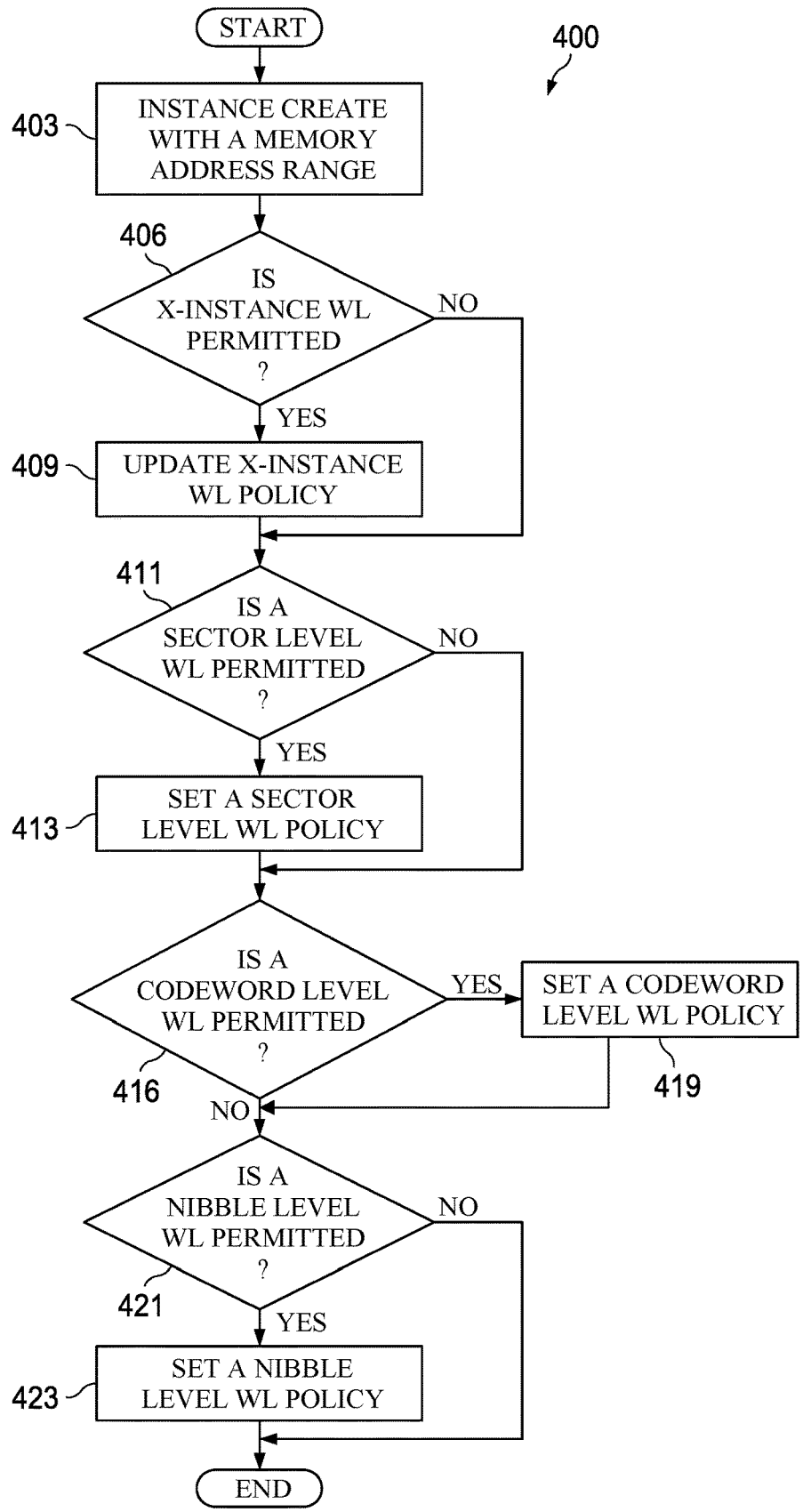
FIG. 4 shows a method for application defined multi-tiered wear-leveling according to an embodiment of the disclosure.

FIG. 4 shows a method 400 for application 111 defined multi-tiered wear-leveling according to an embodiment of the disclosure. For example, method 400 may be implemented by the software wear-leveling module 121, hardware wear-leveling module 124, and/or the wear-leveling policy module 255. In an embodiment, method 400 may be implemented when an instance 115 is created for an application 111, and wear-leveling policies 130 are instantiated for the application 111.

At step 403, an instance 115 may be created for an application 111. For example, processor 205 may create the instance 115 for the application 111. For example, application 111 may request a memory size, a number of memory cells, or a virtual address memory range to be the instance 115 corresponding to the application 111. The instance 115 may include any number of memory cells, and may include one or more bits, nibbles, codewords, and/or sectors. Each application 111 may be assigned a corresponding instance 115 such that each application 111 has a different instance 115, and applications 111 may only be permitted to access the memory cells within the assigned instance 115. The instance 115 may correspond to a physical address range, which may change after each iteration of cross-instance wear-leveling.

At step 406, a determination is made as to whether cross-instance wear-leveling is permitted by the application 111. For example, the wear-leveling policy module 255 may determine whether cross-instance wear-leveling is permitted by the application 111. For example, the software wear-leveling module 121 may determine whether the cross-instance wear-leveling policy 135 indicates that application 111 permits cross-instance wear-leveling. In an embodiment, the application 111 may set a cross-instance wear-leveling policy that permits or prohibits cross-instance wear-leveling based on, for example, a QoS or persistence requirement of the application 111.

At step 409, the cross-instance wear-leveling policy 135 is updated to include application 111 when application 111 permits cross-instance wear-leveling. For example, wear-leveling policy module 255 updates the cross-instance wear-leveling policy 135 to include application 111 when application 111 permits cross-instance wear-leveling.

In the case that cross-instance wear-leveling is not permitted by the application 111, method 400 proceeds to step 411. Method 400 also proceeds to step 411 after updating the cross-instance wear-leveling policy 135 to include application 111 when application 111 permits cross-instance wear-leveling. In this way, method 400 continues to determine whether to set wear-leveling policies at lower levels after determining whether or not to set a wear-leveling policy at a higher level.

At step 411, a determination is made as to whether sector level wear-leveling is permitted by the application 111. For example, wear-leveling policy module 255 determines whether sector level wear-leveling is permitted or requested by the application 111. Sector level wear-leveling refers to performing wear-leveling by changing locations of one or more sector levels 309 within the instance 115. This may prevent one sector level 309 within the instance 115 from wearing out before another sector level 309 within the instance 115.

At step 413, a sector level wear-leveling policy 130 is set for the application 111 when sector level wear-leveling is permitted or requested by the application 111. For example, wear-leveling policy module 255 sets a sector level wear-leveling policy 130 for the application 111 when the application 111 permits or requests sector level wear-leveling.

In the case where sector level wear-leveling is not permitted by application 111, method 400 proceeds to step 416. Method 400 also proceeds to step 416 after setting the sector level wear-leveling policy 130 for the application 111 when the application 111 permits or requests sector level wear-leveling. In this way, method 400 continues to determine whether to set another wear-leveling policy 290 for an application 111 according to a different memory size. At step 416, a determination is made as to whether codeword level wear-leveling is permitted by the application 111. For example, wear-leveling policy module 255 determines whether codeword level wear-leveling is permitted or requested by the application 111. Codeword level wear-leveling refers to performing wear-leveling by changing locations of one or more codeword levels 306 within the instance 115. This may prevent one codeword level 306 from wearing out before another codeword level 306 within the instance 115.

At step 419, a codeword level wear-leveling policy 130 is set for the application 111 when codeword level wear-leveling is permitted or requested by the application 111. For example, wear-leveling policy module 255 sets a codeword level wear-leveling policy 130 for application 111 when the application 111 permits or requests codeword level wear-leveling.

In the case where codeword level wear-leveling is not permitted by application 111, method 400 proceeds to step 421. Method 400 also proceeds to step 421 after setting the codeword level wear-leveling policy 130 for the application 111 when the application 111 permits or requests codeword level wear-leveling. In this way, method 400 continues to determine whether to set another wear-leveling policy 290 for an application 111 according to a different memory size. At step 421, a determination is made as to whether nibble and/or bit level wear-leveling is permitted by the application 111. For example, wear-leveling policy module 255 determines whether nibble and/or bit level wear-leveling is permitted or requested by the application 111. Nibble level wear-leveling refers to performing wear-leveling by changing locations of one or more nibble levels 303 within the instance 115. Bit level wear-leveling refers to performing wear-leveling by changing locations of one or more bit levels 301 within the instance 115. This may prevent one nibble level 303 or bit level 301 from wearing out before another nibble level 303 or bit level 301 within the instance 115.

At step 423, a nibble and/or bit level wear-leveling policy 130 is set for the application 111 when a nibble and/or bit level wear-leveling policy 130 is permitted or requested by the application 111. For example, wear-leveling policy module 255 sets a nibble and/or bit level wear-leveling policy 130 for application 111 when the application 111 permits or requests nibble and/or bit level wear-leveling.

Figure 5A:
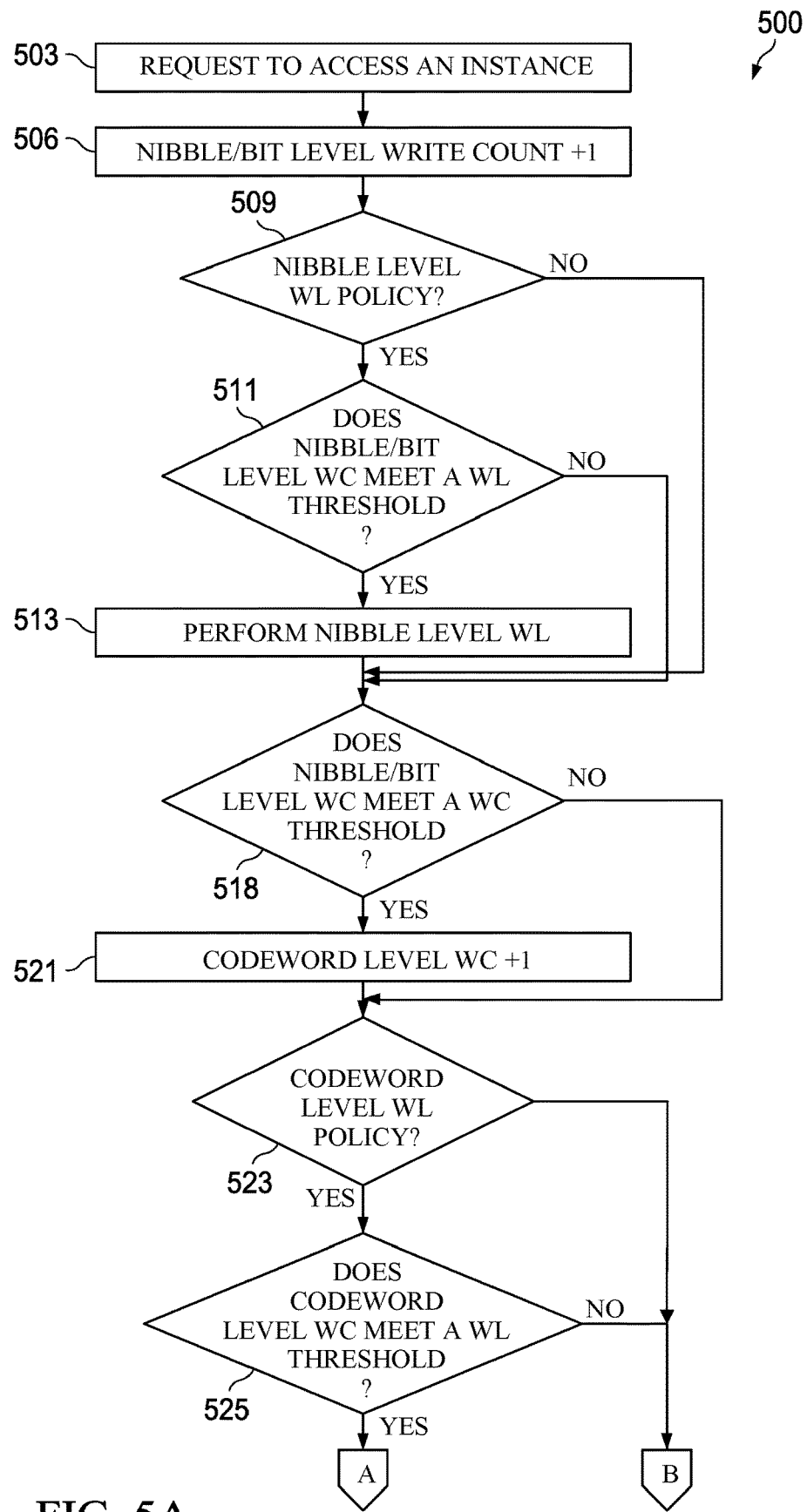
FIGS. 5A and 5B shows a method for application defined multi-tiered wear-leveling according to an embodiment of the disclosure.
Figure 5B:
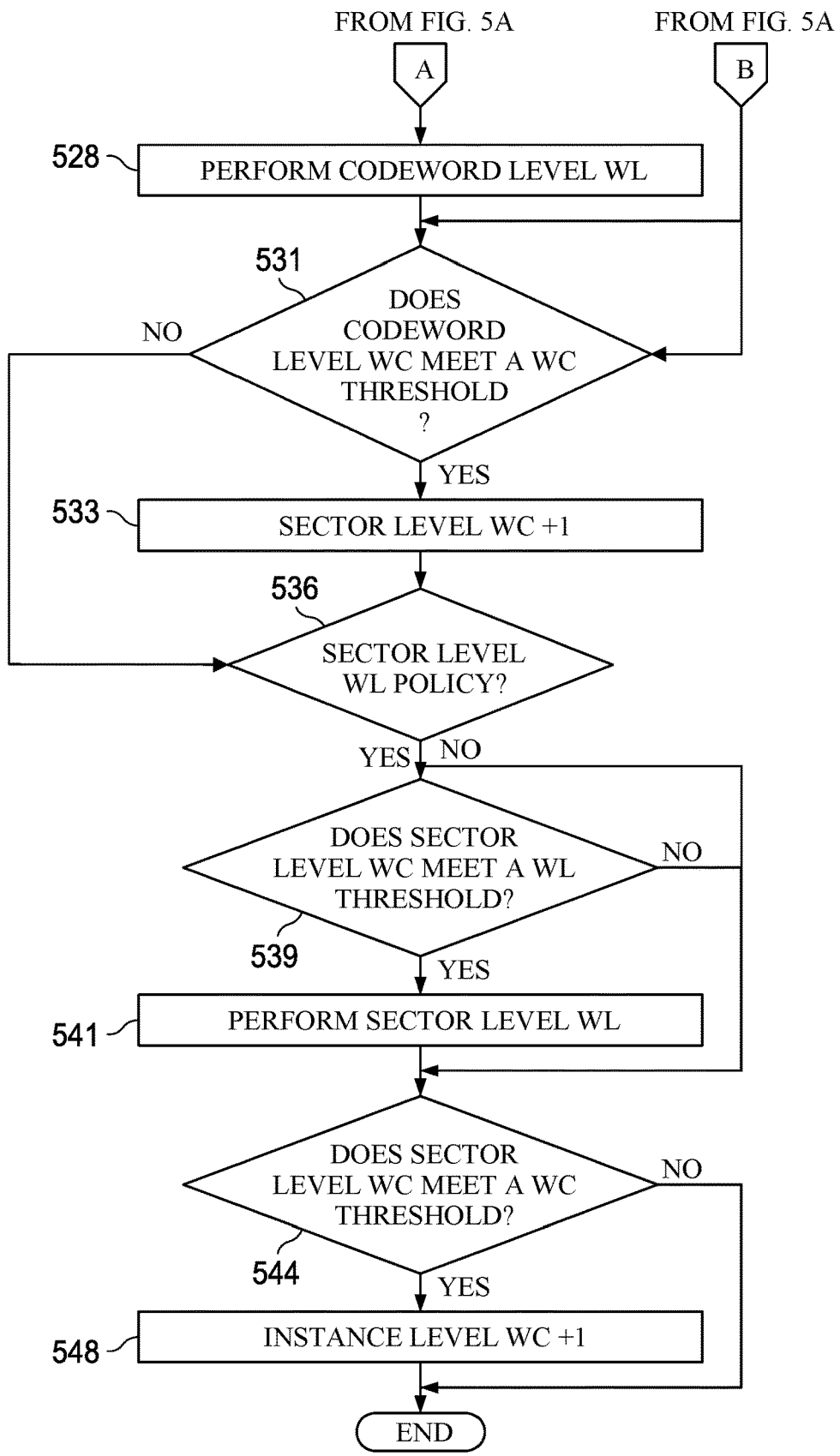

FIGS. 5A and 5B shows a method 500 for application 111 defined multi-tiered wear-leveling according to an embodiment of the disclosure. For example, method 500 may be implemented by the software wear-leveling module 121, hardware wear-leveling module 124, and/or the wear-leveling policy module 255. In an embodiment, method 500 may be implemented when an application 111 requests access to the instance 115 corresponding to the application 111 after the wear-leveling policies 130 have been established for application 111.

At step 503, a request to access the instance 115 corresponding to application 111 is received from the application 111. For example, the processor 205 may receive the request to access the instance 115. For example, the request to access the instance 115 may be a write request including a virtual address of a nibble stored within the instance 115. The request to access the instance 115 may also be a read, erase, replace, or any other function that can be carried out using the virtual address of the nibble. At step 506, the nibble/bit level write count 260 for the nibble included in the request to access the instance 115 may be incremented. For example, the processor 205 increments the nibble/bit level write count 260 of the nibble within the instance 115 that is being accessed.

At step 509, a determination is made as to whether the application 111 has a set a nibble level wear-leveling policy 130. For example, the wear-leveling policy module 255 determines whether the application 111 has set a nibble level wear-leveling policy 130. When the application 111 has set a nibble level wear-leveling policy 130, at step 511, a determination is made as to whether the nibble/bit level write count 260 for the nibble being accessed meets a wear-leveling threshold 297. For example, the wear-leveling policy module 255 determines whether the nibble/bit level write count 260 for the nibble being accessed meets a wear-leveling threshold 297. The wear-leveling threshold 297 is a threshold write count that should be met before performing wear-leveling. As wear-leveling is typically associated with a cost of resources and time, wear-leveling should not be performed more often than necessary. The wear-leveling threshold 297 may facilitate performing wear-leveling in a more efficient manner while conserving resources when possible. When the application 111 has not set a nibble level wear-leveling policy 130, method 500 proceeds to step 518 to determine whether the nibble/bit level write count 260 for the nibble being accessed meets a write count threshold 298. Even though nibble level wear-leveling is not performed, the method 500 may still determine whether the higher level wear leveling write count meets the corresponding write-count threshold 298.

At step 513, nibble level wear-leveling is performed on one or more nibbles within instance 115 when the nibble/bit level write count 260 for the nibble being accessed meets the wear-leveling threshold 297. For example, the wear-leveling policy module 255 performs nibble level wear-leveling on one or more nibbles within the instance 115 in response to determining that the nibble/bit level write 260 for the nibble being accessed meets the wear-leveling threshold 297. Nibble level wearing-leveling may be performed by changing locations of one or more nibble levels 303 within the instance 115 corresponding to the application 111. In an embodiment, the mapping table 295 may be updated to reflect the changed locations of the nibbles within the instance 115.

When the nibble/bit level write count 260 for the nibble being accessed does not meet the wear-leveling threshold 297, method 500 proceeds to step 518. Method 500 also proceeds to step 518 after performing nibble level wear-leveling. At step 518, a determination is made as to whether the nibble/bit level write count 260 for the nibble being accessed meets a write count threshold 298. For example, the wear-leveling policy module 255 determines whether the nibble/bit level write count 260 for the nibble being accessed meets a write count threshold 298. A write count threshold 298 is a minimum value that a write count should be before determining whether to performing carry-in on higher level write count. If the nibble/bit level write count 260 for the nibble being accessed does not meet a write count threshold 298, method 500 proceeds to step 523 to determine whether the application 111 has set a codeword level wear-leveling policy 130.

At step 521, when the nibble/bit level write count 260 for the nibble being accessed meets a write count threshold 298, the codeword level write count 270 is incremented. For example, the wear-leveling policy module 255 increments the codeword level write count 270. At step 523, a determination is made as to whether the application 111 has set a codeword level wear-leveling policy 130. For example, the wear-leveling policy module 255 determines whether the application 111 has set a codeword level wear-leveling policy 130. When the application 111 has set a codeword level wear-leveling policy 130, at step 525, a determination is made as to whether the codeword level write count 270 for the codeword being accessed meets a wear-leveling threshold 297. For example, the wear-leveling policy module 255 determines whether the codeword level write count 270 for the codeword being accessed meets a wear-leveling threshold 297. When the codeword level write count 270 for the codeword being accessed meets a wear-leveling threshold 297, method 500 proceeds to block A, implementing steps shown in FIG. 5B. When the codeword level write count 270 for the codeword being accessed does not meet a wear-leveling threshold 297, method 500 proceeds to block B, also implementing step 531 shown in FIG. 5B. When the application 111 has not set a codeword level wear-leveling policy 130, the method 500 proceeds to step 531 of FIG. 5B to determine whether the codeword level write count 270 for the codeword being accessed meets a write count threshold 298. This is because the codeword level write count 270 may still be examined before determining whether to perform wear-leveling on a higher level.

FIG. 5B is a continuation of method 500 beginning after determining whether a codeword level write count 270 for the codeword being accessed meets a wear-leveling threshold 297. At step 528, codeword level wear-leveling is performed on one or more codewords within instance 115 when the codeword level write count 270 for the codeword being accessed meets the wear-leveling threshold 297. For example, the wear-leveling policy module 255 performs codeword level wear-leveling on one or more codewords within the instance 115 in response to determining that the codeword level write 270 for the codeword being accessed meets the wear-leveling threshold 297. Codeword level wearing-leveling may be performed by changing locations of one or more codeword levels 306 within the instance 115 corresponding to the application 111. In an embodiment, the mapping table 295 may be updated to reflect the changed locations of the codewords within the instance 115.

When the codeword level write count 270 for the codeword being accessed does not meet the wear-leveling threshold 297, method 500 proceeds to step 531. Method 500 also proceeds to step 531 after performing codeword level wear-leveling. At step 531, a determination is made as to whether the codeword level write count 270 for the codeword being accessed meets a write count threshold 298. For example, the wear-leveling policy module 255 determines whether the codeword level write count 270 for the codeword being accessed meets a write count threshold 298. If the codeword level write count 270 for the codeword being accessed does not meet a write count threshold 298, method 500 proceeds to step 523 to determine whether the application 111 has set a sector level wear-leveling policy 130.

At step 533, when the codeword level write count 270 for the codeword being accessed meets a write count threshold 298, the sector level write count 280 is incremented. For example, the wear-leveling policy module 255 increments the sector level write count 280. At step 536, a determination is made as to whether the application 111 has set a sector level wear-leveling policy 130. For example, the wear-leveling policy module 255 determines whether the application 111 has set a sector level wear-leveling policy 130. When the application 111 has set a sector level wear-leveling policy 130, at step 539, a determination is made as to whether the sector level write count 280 for the sector being accessed meets a wear-leveling threshold 297. For example, the wear-leveling policy module 255 determines whether the sector level write count 280 for the sector being accessed meets a wear-leveling threshold 297. When application 111 has not set a sector level wear-leveling policy 130, the method 500 proceeds to step 544 to determine whether the sector level write count 280 for the sector being accessed meets a write count threshold 298.

At step 541, sector level wear-leveling is performed on one or more sectors within instance 115 when the sector level write count 280 for the sector being accessed meets the wear-leveling threshold 297. For example, the wear-leveling policy module 255 performs sector level wear-leveling on one or more sectors within the instance 115 in response to determining that the sector level write 280 for the sector being accessed meets the wear-leveling threshold 297. Sector level wearing-leveling may be performed by changing locations of one or more sector levels 309 within the instance 115 corresponding to the application 111. In an embodiment, the mapping table 295 may be updated to reflect the changed locations of the sectors within the instance 115.

When the sector level write count 280 for the sector being accessed does not meet the wear-leveling threshold 297, method 500 proceeds to step 544. Method 500 also proceeds to step 544 after performing sector level wear-leveling. At step 544, a determination is made as to whether the sector level write count 280 for the sector being accessed meets a write count threshold 298. For example, the wear-leveling policy module 255 determines whether the sector level write count 280 for the sector being accessed meets a write count threshold 298. At step 548, when the sector level write count 280 for the sector being accessed meets a write count threshold 298, the instance level write count 290 is incremented. For example, the wear-leveling policy module 255 increments the instance level write count 290.

In some embodiments, method 500 may circle back and begin again from step 509 at any time during the process of accessing the instance 115. While only wear-leveling according to the nibble level 303, codeword level 306, and sector level 309 are described in method 500, it should be appreciated that an application 111 may define wear-leveling to be performed according to any memory size within the instance 115. For example, method 500 may also be used to perform wear-leveling according to the bit level 301 when an application 111 has set a bit level wear-leveling policy 130. In this way, the hardware wear-leveling module 124 executes within the hardware memory layer 109 to perform wear-leveling according any memory size in a manner similar to that shown in method 500.

Figure 6:
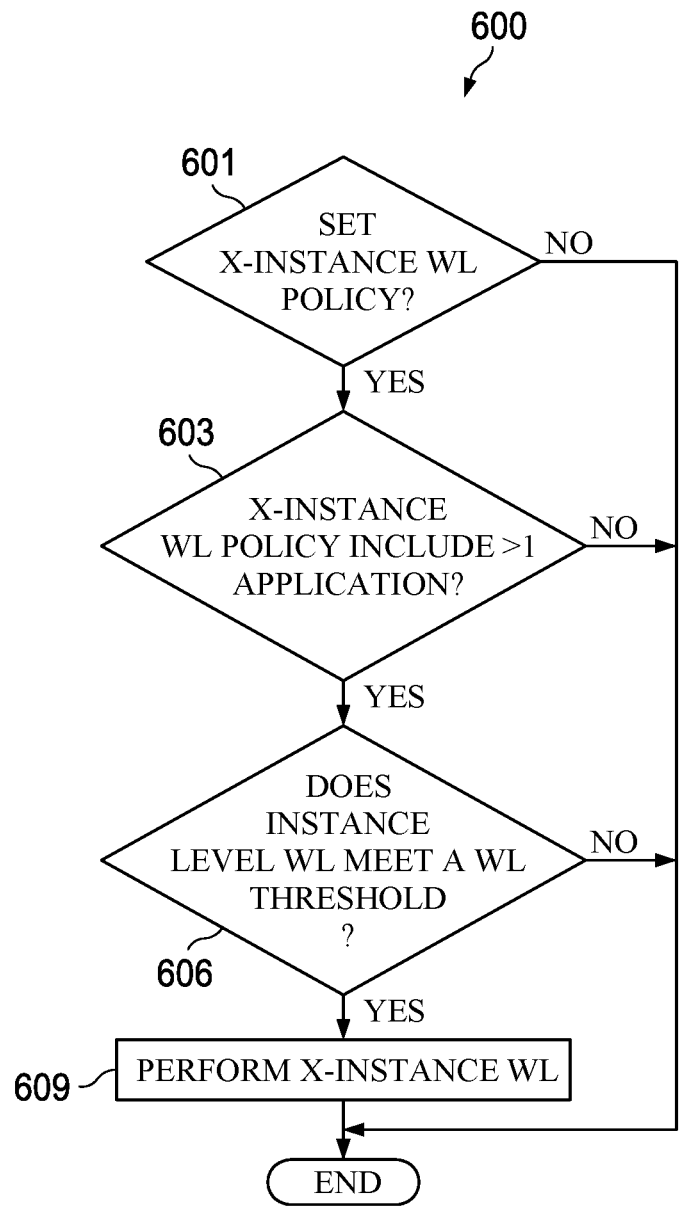
FIG. 6 shows a method for application defined multi-tiered wear-leveling according to an embodiment of the disclosure.

FIG. 6 shows a method 600 for application 111 defined multi-tiered wear-leveling according to an embodiment of the disclosure. For example, method 600 may be implemented by the software wear-leveling module 121, hardware wear-leveling module 124, and/or the wear-leveling policy module 255. In an embodiment, method 600 may be implemented when an application 111 sets a cross-instance wear leveling policy 135.

At step 601, a determination is made as to whether application 111 has set a cross-instance wear-leveling policy 135. For example, wear-leveling policy module 255 determines whether application 111 has set a cross-instance wear-leveling policy 135. At step 603, a determination is made as to whether more than one application 111 has set a cross-instance wear-leveling policy 135. For example, wear-leveling policy module 255 determines whether more than one application 111 has set a cross-instance wear-leveling policy 135. Since cross-instance wear leveling involves data from two instances 115 changing physical addresses, at least two applications 111 should set a cross-instance wear-leveling policy 135. Method 600 ends if at least two applications 111 have not set cross-instance wear-leveling policies 135.

At step 606, a determination is made as to whether the instance level write count 290 for the instance 115 being accessed meets a wear-leveling threshold 297. For example, the wear-leveling policy module 255 determines whether the instance level write count 290 for the sector being accessed meets a wear-leveling threshold 297. At step 609, cross-instance wear-leveling is performed between the instance 115 being accessed and another instance 115 corresponding to another application 111 when the instance level write count 290 for the sector being accessed meets a wear-leveling threshold 297. For example, the wear-leveling policy module 255 performs cross-instance wear-leveling between instance 115 and another instance 115.

Figure 7:
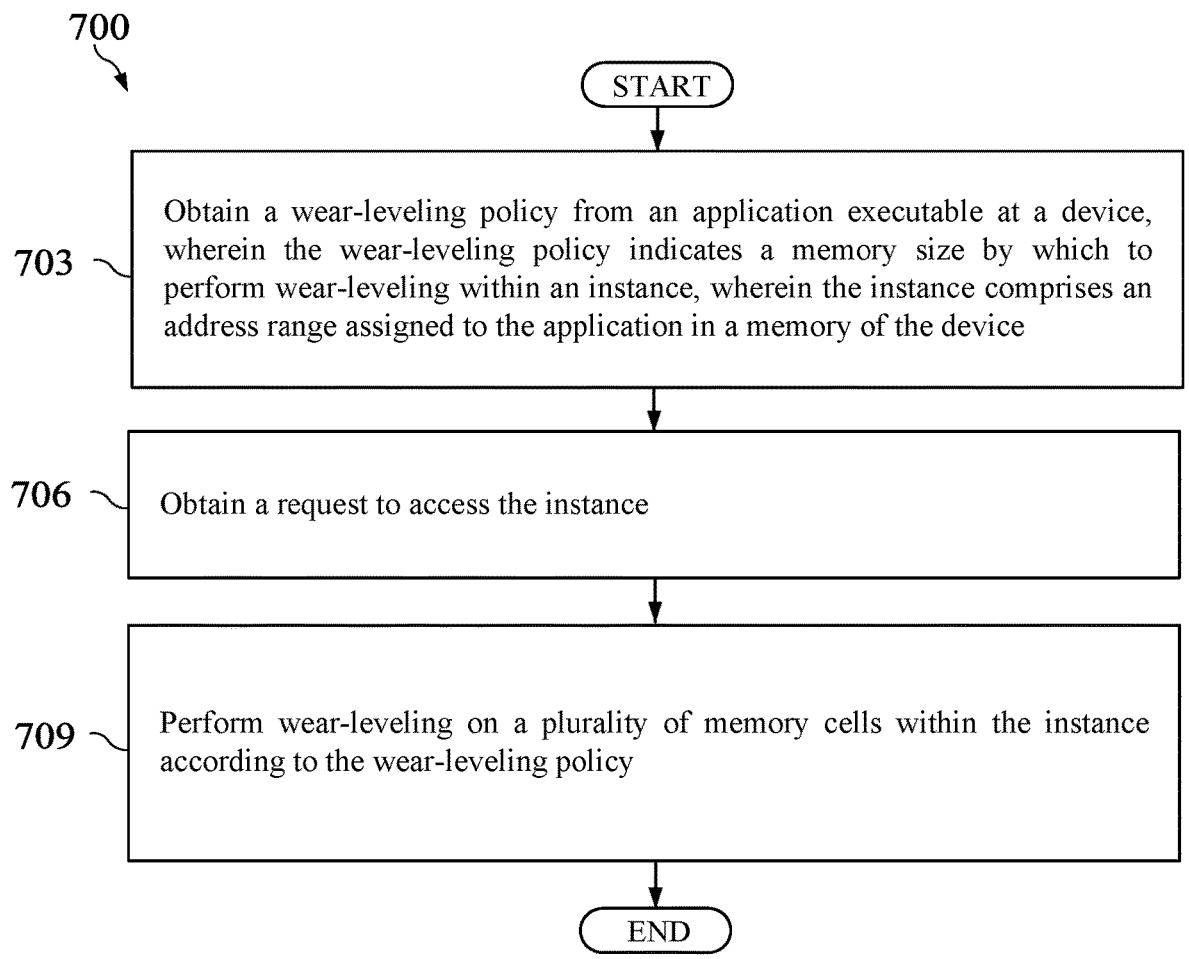
FIG. 7 is a method for application defined multi-tiered wear-leveling according to an embodiment of the disclosure.

FIG. 7 is a method 700 for application 111 defined multi-tiered wear-leveling according to an embodiment of the disclosure. Method 700 may be implemented by the software wear-leveling module 121 and the hardware wear-leveling module 124. Method 700 may also be implemented by the wear-leveling policy module 255. Method 700 may be implemented when an application 111 sets one or more wear-leveling policies 130 at a memory device 200.

At step 703, a wear-leveling policy 130 is obtained from an application 111 executable at the memory device 200. For example, wear-leveling policy module 255 and/or software wear-leveling module 121 obtains the wear-leveling policy 130 from the application 111. For example, a wear-leveling policy 130 may be a set of executable instructions that are stored at a memory 250 of a memory device 200. In one embodiment, the wear-leveling policy 130 may receive the set of executable instructions that corresponds to the wear-leveling policy 130 from the memory 250. In one embodiment, the wear-leveling policy module 255 and/or software wear-leveling module 121 may load the set of executable instructions or program code that corresponds to the wear-leveling policy 130 from the memory 250. In some embodiments, obtaining the wear-leveling policy 130 may refer to receiving the instructions corresponding to the wear-leveling policy 130 from the memory 250. In an embodiment, the wear-leveling policy 130 indicates a memory size by which to perform wear-leveling within an instance 115. In an embodiment, the instance 115 comprises an address range assigned to the application 111 in the memory 250 of the memory device 200. The address range may be a virtual address range or a physical address range.

At step 706, a request to access the instance 115 is obtained. For example, wear-leveling policy module 255 and/or software wear-leveling module 121 obtains the request to access the instance 115 from an application 111. For example, the request to access the instance 115 may be a write request or read request from a client. At step 709, wear-leveling is performed on a plurality of memory cells within the instance 115 according to the wear-leveling policy 130. For example, wear-leveling policy module 255 and/or software wear-leveling module 121 performs wear-leveling on a plurality of memory cells within the instance 115 according to the wear-leveling policy 130.

FIG. 8 shows a table 800 illustrating how different examples of storage structures, data structures, and access patterns may use the wear-leveling policies 130 disclosed herein. As shown in table 800, column 803 shows different examples of storage structures. Column 806 shows different data structures and access patterns corresponding to the storage structures. Column 809 shows different memory sizes corresponding to the storage structures. Column 811 shows different persistence requirements corresponding to the storage structures. Columns 812, 815, 818, and 821 show different wear-leveling policies 130 that may be set for the corresponding storage structures based on the data structures, access patterns, memory size, and persistence requirements.

The different rows in table 800 correspond to different examples of storage structures having different data structures, access patterns, memory sizes, and persistence requirements. As shown in table 800, row 825 is a read cache metadata storage structure, row 828 is a read cache data storage structure, row 831 is a write journaling storage structure, and row 834 is a write cache data storage structure. As shown in table 800, each of those storage structures may set different level wear-leveling policies 130 depending on the data structures, access patterns, memory sizes, and persistence requirements corresponding to the storage structure. For example, the write journaling and write cache data storage structures have a high persistence requirement, which means that applications 111 using these types of storage structures do not want to corrupt the data stored at these storage structures. Therefore, storage structures having a high persistence requirement do not permit cross-instance wear-leveling (as shown in column 821).

FIG. 9 shows a table 900 further illustrating how different examples of storage structures having different memory usage, access patterns, memory sizes, and QoS requirements may use the wear-leveling policies 130 disclosed herein. As shown in table 9, column 903 shows different examples of memory usage and access patterns that may be used by an application 111. Column 906 shows different memory sizes corresponding to the storage structures and/or applications 111 using the storage structures. Column 909 shows different QoS requirements corresponding to the storage structures and/or applications 111 using the storage structures. Columns 911, 912, 915, and 918 show different wear-leveling policies 130 that may be set for the corresponding storage structures and/or applications 111 based on the memory usage, access patterns, memory sizes, and QoS requirements.

The different rows 930-934 in table 900 may correspond to different examples of virtual machines running applications 111 having different memory usage, access patterns, memory sizes, and QoS requirements. As shown in table 900, each of those virtual machines may set different level wear-leveling policies 130 depending on the memory usage, access patterns, memory sizes, and QoS requirements corresponding to the virtual machine and/or application 111. For example, the virtual machine having instructions/read only, executable byte-size access as shown in row 921 has a high QoS requirement, which means that the data stored by this virtual machine may not be moved around. Accordingly, no wear-leveling policies 130 have been set for this virtual machine having a high QoS requirement. In contrast, a virtual machine running applications 111 with a medium QoS requirement may include different types of wear-leveling policies 130 depending on the memory usage or access patterns.

Figure 10:
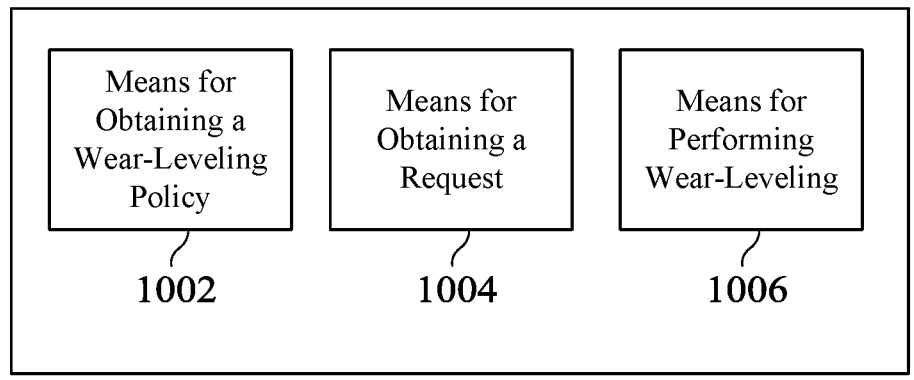
FIG. 10 illustrates an apparatus configured to implement wear-leveling policies according to various embodiments of the disclosure.

FIG. 10 illustrates is an apparatus 1000 configured to implement one or more of the methods described herein such as, for example, the method 700 of FIG. 7. The apparatus 1000 comprises a means 1002 for obtaining a wear-leveling policy from an application executable at the memory device. In one embodiment, the wear-leveling policy indicates a memory size by which to perform wear-leveling within an instance. In one embodiment, the instance comprises an address range assigned to the application in the memory of the memory device. The apparatus further comprises a means 1004 for obtaining a request to access the instance. The apparatus further comprises a means 1006 for performing wear-leveling on a plurality of memory cells within the instance according to the wear-leveling policy.

As disclosed herein, the multi-tiered wear-leveling scheme is implemented at different layers, such as at the bit level 301, nibble level 303, codeword level 306, sector level 309, or instance level 311. The write count based functions disclosed herein provide a mechanism to change a rotation frequency within each level of wear-leveling and increase the write count of the upper layer. The application 111 defined mechanism enables applications to select or bypass layers while performing wear-leveling to provide for more endurance of the system and enables the application to customize wear-leveling within the instance based on persistence and QoS requirements.

According to one aspect of the present disclosure, there is provided a system comprising an obtaining module or a means for obtaining a wear-leveling policy from an application executable at the memory device, wherein the wear-leveling policy indicates a memory size by which to perform wear-leveling within an instance, wherein the instance comprises an address range assigned to the application in the memory of the memory device, an obtaining module or a means for obtaining a request to access the instance, and a wear-leveling module or a means for performing wear-leveling on a plurality of memory cells within the instance according to the wear-leveling policy.

Optionally, in any of the preceding aspects, another implementation of the aspect provides that the memory size is at least one of a bit, a nibble, a codeword, or a sector.

Optionally, in any of the preceding aspects, another implementation of the aspect provides that the means for performing wear-leveling on the plurality of memory cells according to the wear-leveling policy comprises a means for moving data of the memory size stored in the plurality of memory cells to different ones of the plurality of memory cells.

Optionally, in any of the preceding aspects, another implementation of the aspect provides that the system further comprises a determining module or a means for determining whether a write count for the address range associated with the memory size is greater than or equal to a wear-leveling threshold, wherein wear-leveling is performed when the write count is greater than or equal to the wear-leveling threshold.

Optionally, in any of the preceding aspects, another implementation of the aspect provides that the request to access the instance is a write request comprising an address of a nibble, the wear-leveling policy indicates that the memory size by which to perform wear-leveling is the nibble, the nibble comprises four bits of data, and method further includes an obtaining module or a means for obtaining, a write count of the nibble associated with the address in the write request, and incrementing a write count of a codeword associated with the address when the write count of the nibble is greater than or equal to a write count threshold.

Optionally, in any of the preceding aspects, another implementation of the aspect provides that the request to access the instance is a write request comprising an address of a codeword, the wear-leveling policy indicates that the memory size by which to perform wear-leveling is the codeword, and the system further comprises an obtaining module or a means for obtaining a write count of the codeword associated with the address in the write request, and incrementing a write count of a sector associated with the address when the write count of the codeword is greater than or equal to a write count threshold.

Optionally, in any of the preceding aspects, another implementation of the aspect provides that the request to access the instance is a write request comprising an address of a sector, the wear-leveling policy indicates that the memory size by which to perform wear-leveling is the sector, and the system further comprises an obtaining module or a means for obtaining a write count of the sector associated with the address in the write request, and a an incrementing module or a means for incrementing a write count of the instance when the write count of the sector is greater than or equal to a write count threshold.

Optionally, in any of the preceding aspects, another implementation of the aspect provides that the method further includes an obtaining module or a means for obtaining a cross-instance wear-leveling policy from a second application executable at the memory device, wherein the cross-instance wear-leveling policy indicates whether wear-leveling between instances assigned to different applications is permitted, and a cross-instance wear-leveling module or a means for performing cross-instance wear-leveling between the instance of the application and a second instance assigned to the second application when the cross-instance wear-leveling policies of the application and the second application indicate that wear-leveling between memory cells assigned to different applications is permitted.

Optionally, in any of the preceding aspects, another implementation of the aspect provides that the cross-instance wear-leveling is performed in response to a write count of the address range being greater than or equal to a cross-instance wear-leveling threshold.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a memory device, comprising:
   obtaining, by a processor coupled to a memory, a wear-leveling policy from an application executable at the memory device, the wear-leveling policy indicating a memory size by which to perform wear-leveling within an instance that comprises an address range assigned to the application in the memory of the memory device, different applications being assigned different address ranges in the memory of the memory device;
   obtaining, by a processor, a request to access the instance, wherein the request to access the instance is a write request comprising an address of a sector, and wherein the wear-leveling policy indicates that the memory size by which to perform wear-leveling is the sector;
   obtaining, by the processor, a write count of the sector associated with the address in the write request;
   performing, by the processor, wear-leveling on a plurality of memory cells within the instance according to the wear-leveling policy in response to obtaining the request to access the instance; and
   incrementing, by the processor, a write count of the instance when the write count of the sector is greater than or equal to a write count threshold.

2. The method of claim 1, wherein the memory size is at least one of a bit, a nibble, a codeword, or a sector.

3. The method of claim 1, wherein performing wear-leveling on the plurality of memory cells according to the wear-leveling policy comprises moving data of the memory size stored in the plurality of memory cells to different ones of the plurality of memory cells.

4. The method of claim 1, further comprising determining, by the processor, whether a write count for the address range associated with the memory size is greater than or equal to a wear-leveling threshold, wherein wear-leveling is performed when the write count is greater than or equal to the wear-leveling threshold.

5. The method of claim 1, wherein the request to access the instance is a write request comprising an address of a nibble, wherein the wear-leveling policy indicates that the memory size by which to perform wear-leveling is the nibble, wherein the nibble comprises four bits of data, and further comprising:
   obtaining, by the processor, a write count of the nibble associated with the address in the write request; and
   incrementing, by the processor, a write count of a codeword associated with the address when the write count of the nibble is greater than or equal to a write count threshold.

6. The method of claim 1, wherein the request to access the instance is a write request comprising an address of a codeword, wherein the wear-leveling policy indicates that the memory size by which to perform wear-leveling is the codeword, and further comprising:
   obtaining, by the processor, a write count of the codeword associated with the address in the write request; and
   incrementing, by the processor, a write count of a sector associated with the address when the write count of the codeword is greater than or equal to a write count threshold.

7. The method of claim 1, further comprising:
   obtaining, by a processor, a cross-instance wear-leveling policy from a second application executable at the memory device, wherein the cross-instance wear-leveling policy indicates whether wear-leveling between instances assigned to different applications is permitted; and
   performing, by the processor, cross-instance wear-leveling between the instance of the application and a second instance assigned to the second application when the cross-instance wear-leveling policies of the application and the second application indicate that wear-leveling between memory cells assigned to different applications is permitted.

8. The method of claim 7, wherein the cross-instance wear-leveling is performed in response to a write count of the address range being greater than or equal to a cross-instance wear-leveling threshold.

9. A memory device, comprising:
   a memory; and a processor coupled to the memory and configured to:
obtain a wear-leveling policy from an application executable at the memory device, the wear-leveling policy indicating a memory size by which to perform wear-leveling within an instance that comprises an address range assigned to the application in the memory of the memory device, different applications being assigned different address ranges in the memory of the memory device, wherein the request to access the instance is a write request comprising an address of a nibble, and wherein the wear-leveling policy indicates that the memory size by which to perform wear-leveling is the nibble;
obtain a request to access the instance;
obtain a write count of the nibble associated with the address in the write request;
perform wear-leveling on a plurality of memory cells within the instance according to the wear-leveling policy in response to the request to access the instance being obtained; and
increment a write count of the nibble associated with the address in the write request.

10. The memory device of claim 9, wherein the wear-leveling policy indicates that wear-leveling may be performed on a sector level or instance level.

11. The memory device of claim 9, wherein the memory size is at least one of a bit, a nibble, a codeword, or a sector.

12. The memory device of claim 9, wherein the processor is further configured to move data of the memory size stored in the plurality of memory cells to different ones of the plurality of memory cells.

13. The memory device of claim 9, wherein the processor is further configured to determine whether a write count for the address range associated with the memory size is greater than or equal to a wear-leveling threshold, wherein the wear-leveling is performed when the write count is greater than or equal to the wear-leveling threshold.

14. A memory device, comprising:
a storage class memory (SCM);
a memory coupled to the SCM and comprising instructions; and
a processor coupled to the SCM and the memory, wherein the processor executes the instructions to:
obtain a wear-leveling policy from an application executable at the memory device, the wear-leveling policy indicating a memory size by which to perform wear-leveling within an instance that comprises an address range assigned to the application in the memory of the memory device, different applications being assigned different address ranges in the memory of the memory device;
obtain a request to access the instance, wherein the request to access the instance is a write request comprising an address of a codeword, wherein the wear-leveling policy indicates that the memory size by which to perform wear-leveling is the codeword;
obtain a write count of the codeword associated with the address in the write request;
perform wear-leveling on a plurality of memory cells within the instance according to the wear-leveling policy in response to the request to access the instance being obtained; and
increment a write count of a sector associated with the address when the write count of the codeword is greater than or equal to a write count threshold after the wear-leveling is performed.

15. The memory device of claim 14, wherein the request to access the instance is a write request comprising an address of a sector, wherein the wear-leveling policy indicates that the memory size by which to perform wear-leveling is the sector, and wherein the processor further executes the instructions to:
obtain a write count of the sector associated with the address in the write request; and
increment a write count of the instance when the write count of the sector is greater than or equal to a write count threshold.

16. The memory device of claim 14, wherein the processor further executes the instructions to:
obtain a cross-instance wear-leveling policy from a second application executable at the memory device, wherein the cross-instance wear-leveling policy indicates whether wear-leveling between instances assigned to different applications is permitted; and
perform cross-instance wear-leveling between the instance to the application and a second instance assigned to the second application when the cross-instance wear-leveling policy of the application and the second application indicates that wear-leveling between memory cells assigned to different applications is permitted.

17. The memory device of claim 16, wherein the cross-instance wear-leveling is performed in response to a write count of the address range being greater than or equal to a cross-instance wear-leveling threshold.

* * * * *